May 1, 1934.  K. A. R. JOHANSSON  1,957,044

MULTIPLE VALVE

Filed July 8, 1930   5 Sheets-Sheet 1

INVENTOR
Karl Alfred Ragnar Johansson

BY
His ATTORNEY

May 1, 1934.　　　K. A. R. JOHANSSON　　　1,957,044
MULTIPLE VALVE
Filed July 8, 1930　　　5 Sheets-Sheet 2

INVENTOR
Karl Alfred Tagnar Johansson
BY
Wm J. Hedlund
his ATTORNEY

May 1, 1934.  K. A. R. JOHANSSON  1,957,044

MULTIPLE VALVE

Filed July 8, 1930  5 Sheets-Sheet 4

May 1, 1934.　　　K. A. R. JOHANSSON　　　1,957,044
MULTIPLE VALVE
Filed July 8, 1930　　　5 Sheets-Sheet 5

Fig.10

INVENTOR
Karl Alfred Ragnar Johansson
BY
Wm J Hedlund
his ATTORNEY

Patented May 1, 1934

1,957,044

UNITED STATES PATENT OFFICE 1,957,044

MULTIPLE VALVE

Karl Alfred Ragnar Johansson, Stockholm, Sweden, assignor to Aktiebolaget Filtrum, Stockholm, Sweden, a corporation of Sweden Application July 8, 1930, Serial No. 466,408
In Sweden July 9, 1929

31 Claims. (Cl. 137—144)

The present invention relates in general to multiple valves and has particular reference to valves of the type adapted to be used in conjunction with regenerative water-softening systems requiring a plurality of fluid connections to be periodically altered.

One of the objects of the invention is to provide an improved form of multiple valve actuated by pressure of the fluid passing through the valve to move it to the several required positions. Another object is to provide a multiple valve of the rotary or plug type in which leakage of the fluid is effectively prevented between certain connections within the valve when such connections are in non-communicating positions. A still further object of the invention is to provide a simple and rugged mechanism which upon initial manual actuation will continue automatically under the influence of fluid pressure through a predetermined cycle of operations and then automatically stop.

Amongst other objects of the invention are to provide a rotary plug valve of the character described in which rotation of the valve to change the desired connections is effected slowly in order to avoid water hammer in the system in which the valve is incorporated; to provide a rotary plug valve in which rotation is effected in a step-by-step-manner; to provide a rotary plug valve in which the main valve member is caused to reciprocate under the influence of fluid pressure and to rotate due to its reciprocation; to provide a valve of the character described in which reciprocation of the main valve member is controlled by actuation of a pilot valve; to provide a valve of the character described in which a secondary valve member or piston is operated in conjunction with the operation of the main valve, and to provide a valve of the character described in which the secondary member or piston acts to seal, under the influence of fluid pressure, one of the valve connections to prevent leakage of pressure fluid from the valve.

Other and more detailed objects of the invention will appear in connection with the following description of one example of the invention as illustrated in the accompanying drawings forming a part of this specification.

Figure 1:
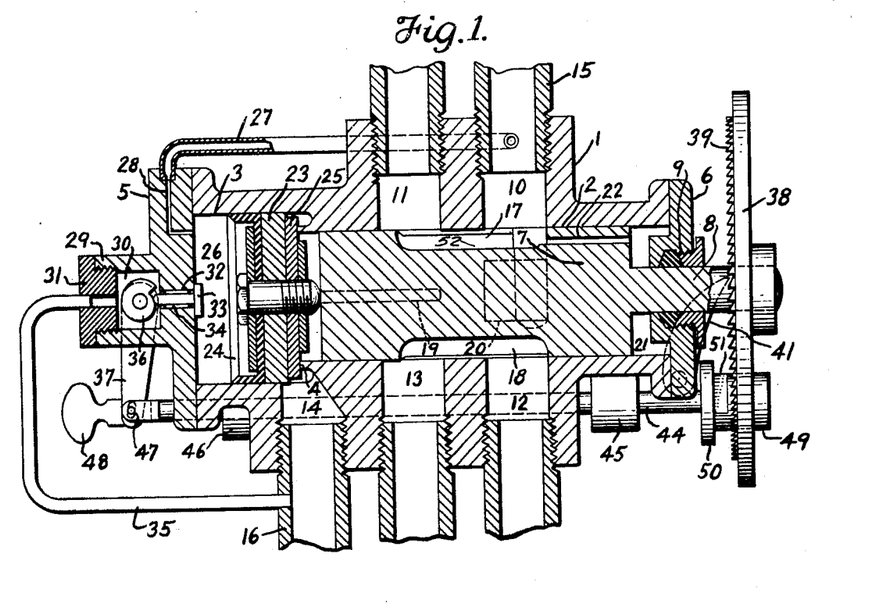
Fig. 1 is a central section of the valve assembly.
Figure 2:
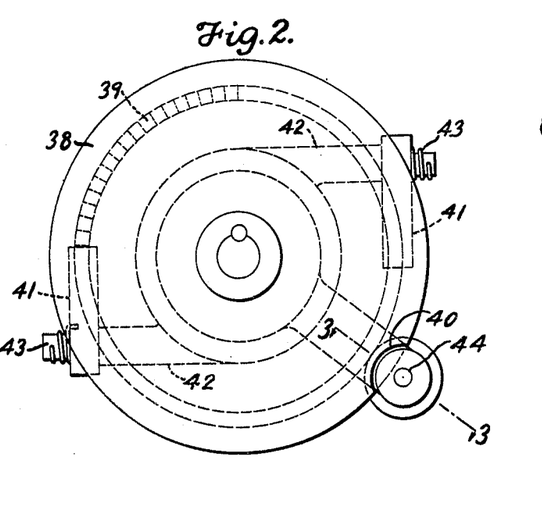
Fig. 2 is an end view of Fig. 1 looking from the right.
Figure 3:
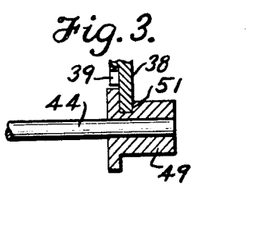
Fig. 3 is a fragmentary section taken on the line 3—3 of Fig. 2.

Referring now to Figs. 1 to 3 of the drawings, 1 designates the valve body or casing having a longitudinal bore 2 therethrough which is counterbored at one end, as at 3, to provide an annular valve seat 4 at the inner end of the counterbore. The bore of the casing 1 is closed at its ends by the cover plates 5 and 6, which may be secured to the casing in any suitable pressure-tight-manner.

The main valve member 7 is seated within the bore 2, said member being adapted to rotate and to reciprocate, and having an extension 8 of relatively small diameter passing through a stuffing box 9 in the cover plate 6. Casing 1 is provided with a plurality of ports communicating with the bore 2. In the illustrative example these comprise the ports 10 and 11 at one side of the valve and ports 12, 13 and 14 at the other side of the valve, pressure fluid being adapted to be supplied to port 10 through conduit 15, while port 14 is connected to drain by conduit 16. The number and specific arrangement of the valve ports are not per se a part of the present invention and may be altered in any desired manner in order to adapt the valve to use in a given installation.

The valve member 7 is provided with channels 17 and 18, the former being adapted to provide communication between ports 10 and 11, while the latter is adapted to provide communication between ports 12 and 13 in the position illustrated by Fig. 1. The several ports are adapted to be connected in a different manner in other positions of the valve by means of ports 19 and 20.

A chamber 21 is provided around the extension 8, and by means of the passage 22 in valve member 7, this chamber is placed in communication with the channel 17. A piston 23 is reciprocably mounted in the counterbore 3, and is provided on one side with a suitable packing-member 24, which may be of the usual leather cup form. The other side of piston 23 is provided with a plate 25 adapted to seat against the valve seat 4 in certain positions of the piston. The length of the counterbore 3 is such that a chamber 26 is formed between piston 23 and the cover plate 5 when the piston is at the right hand end of its travel. The pressure fluid supply conduit 15 is placed in communication with chamber 26 by means of a conduit comprising pipe 27 and a small diametered passage 28 in the cover plate 5.

Cover plate 5 is provided with an annular extension 29 providing a chamber 30 closed by the plug 31. Chamber 30 is placed in communication with chamber 26 by means of the passage 32. A pilot valve 33, the head of which is in chamber 26, controls flow through passage 32, the stem of said valve being provided with guide wings 34 bearing against the side walls. The free flow area through passage 32 between the wings 34, when the valve 33 is open, is greater than the area of the passage 28. Chamber 30 is connected with drain conduit 16 by means of the pipe 35. Located within this chamber is the cam plate 36 mounted on a shaft passing through suitable stuffing boxes in the extension 29 and adapted to be turned by the lever 37. The cam plate 36 is located with respect to the stem of pilot valve 33 so that upon movement of lever 37 in counter-clockwise direction, as viewed in Fig. 1, valve 33 will be opened by the cam; conversely, clockwise movement of lever 37 moves the cam plate to a position permitting the valve 33 to be closed by fluid pressure within the chamber 26.

The extension 8 of the main valve member has a disc 38 rigidly secured to its outer end, and is provided with a ring of teeth 39 on the face of the disc adjacent to the valve casing. Disc 38 is further provided with an arcuate recess 40 (see Fig. 2), said recess lying at the circumference of the disc and radially outside the ring of teeth 39.

A pair of pawls 41, shown in dotted lines in Figs. 1 and 2, are rotatably mounted upon suitable extensions 42 formed as part of the valve casing. Pawls 41 are preferably held in engagement with the teeth 39 by means of springs 43, which are relatively weak and only strong enough to prevent the pawls from being accidentally moved out of position. An operating rod 44 is reciprocably mounted parallel to the axis of the main valve member in suitable bearing lugs 45 and 46 provided on the valve casing, and is pivotally connected at one end, as at 47, to the lever 37, while this end of the rod is also provided with a manually operable handle 48.

The opposite end of the rod 44 has a cylinder 49 mounted thereon which is provided with a flange 50 at its inner end. Adjacent to the flange 50 is an arcuate recess 51. As will be seen from Fig. 2, rod 44 is mounted so that the cylinder 49 is reciprocable in the recess 40 cut in the disc 38, and the recess 51 provided in cylinder 49 is located so that when the rod is moved from the position shown in Fig. 1 to the position shown in Fig. 3, the disc 38 may move into the recess 51 so that the disc and the operating rod are constrained to move axially as a unit.

The operation of the device is as follows: Let it be assumed that fluid under pressure is admitted to the device through the inlet conduit 15. With the valve in the position shown in Fig. 1, the fluid will pass by way of port 10 and passage 22 to the chamber 21 at the right-hand end of the main valve member. It will also pass by way of pipe 27 and passage 28 to chamber 26 to the left of piston 23. Due to the fact that the effective area of piston 23 is greater than the effective area of the right-hand end of the valve member, the piston, and with it the main valve member, will be moved to the right until the plate 25 on the piston is firmly seated on seat 4. It will be seen that in this position of the valve the connection to the drain port 14 is tightly closed to prevent leakage from the valve mechanism to the drain.

With the mechanism in the position shown the cylinder 49 is in the recess 40 and holds the disc 38 and consequently the main valve member 7 against turning movement.

If the manually operable handle 48 is pushed from left to right, as viewed in Fig. 1, the pilot valve 33 is opened by movement of the cam plate 36, and the recess 51 in cylinder 49 is moved into registry with the disc 38. Since, as previously noted, the free flow area through the passage 32 is greater than that through pasage 28, pressure in chamber 26 is relieved and the main valve member 7 and piston 23 are moved to the left as in Fig. 1 due to the pressure in chamber 21. As this right to left movement of the main valve member occurs the valve is turned slightly by the pawls 41 in engagement with the teeth 39. This turning movement of the valve member is possible due to the fact that the recess 51 is in registry with the disc 38 and the periphery of the latter moves into the recess to form a locking engagement between the main valve member and the operating rod assembly.

As the rod is moved from right to left due to movement of the main valve member, the cam plate 36 is rotated in clockwise direction to permit the pilot valve 33 to close. Closure of this valve causes pressure to be again built up in chamber 26 to overcome the pressure existing in chamber 21, and the valve and operating rod are again moved from left to right. During this movement of the mechanism the main valve member is not turned and the pawls 41 drop into notches formed by the next succeeding teeth 39. By the time the valve and operating rod have reached the right-hand end of their travel the cam plate 36 has again opened pilot valve 33 and the pressure in chamber 26 is again relieved so that right to left movement of the main valve takes place. This movement is accompanied by a slight turning movement due to the action of pawls 41. The above described operation continues until the valve member 7 has been turned, step by step, through a complete revolution so that the recess 40 is again brought into registry with the cylinder 49 upon the last right to left movement of the valve. With recess 40 in registry with cylinder 49, the final left to right movement of the valve, caused by the pressure in chamber 26, does not cause a corresponding left to right movement of the operating rod 44. Consequently, pilot valve 33 remains closed and the mechanism comes to rest in its original position, which is that shown in Fig. 1. It will be obvious that the valve will remain in this position until the operating rod is again actuated from some outside source, and upon such actuation the valve will operate automatically through its cycle of movement and will again come to rest automatically.

In the description of the embodiments of the invention illustrated in Figs. 4 to 9 parts corresponding to those in Figs. 1 to 3 have been designated by the same reference characters.

The embodiment shown in Figs. 4 to 8 will now be described, it being assumed that the valve is to be used in connection with a water softening apparatus of the type in which the water to be softened passes downwards through the softening bed.

Figure 4:
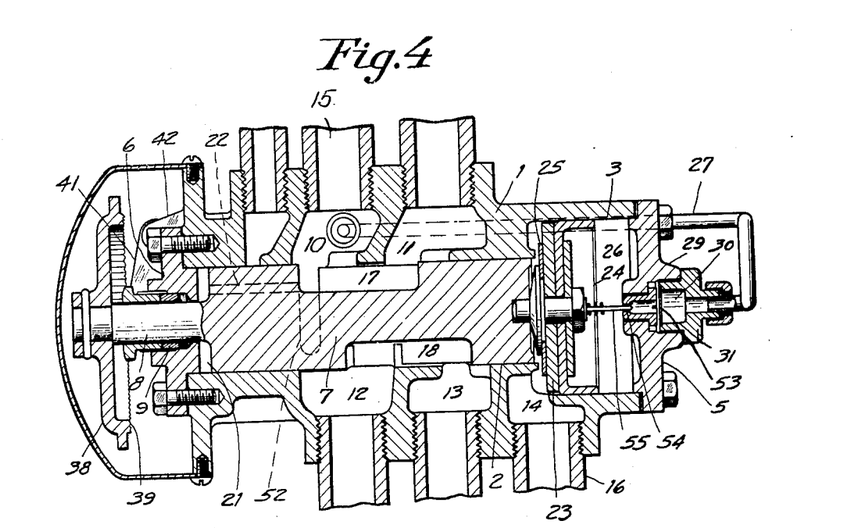
Fig. 4 is a central section of a further embodiment of the valve.

Pressure fluid is supplied to port 10 through pipe 15 and passes through channel 17 and bore 11 to the top of the filter container (not shown). The softened water enters the valve again through bore 13 and is passed to the service-system through channel 18 and bore 12. As described in connection with Fig. 1 the main valve member 7, after starting the valve mechanism, will oscillate and rotate slowly within the valve body 1, thereby successively effecting different connections between the conduits connected with the valve body. By means of a peripherally arranged channel 52 direct connection between ports 10 and 12 is effected in all but one position of member 7, i. e. the raw water supplied to a filter container (not shown) is by-passed in all positions of the valve except in the position where the filter container is in use for softening the raw water. In Fig. 4 the valve is shown in a position for directing raw water to a filter container.

Figure 6:
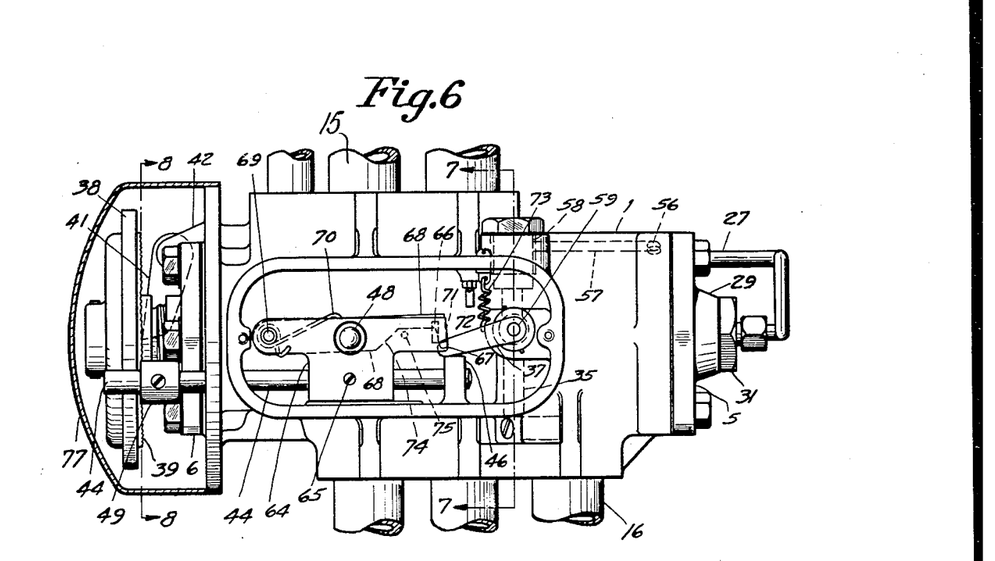
Fig. 6 is an elevational view, partly in section, of the valve shown in Fig. 4.
Figure 7:
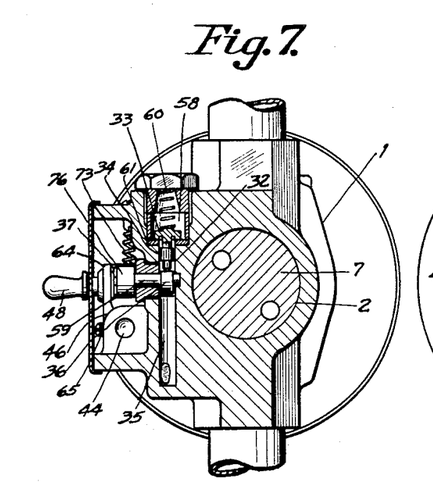
Fig. 7 is an elevational view, partly in section, along line 7—7 of Fig. 6.
Figure 8:
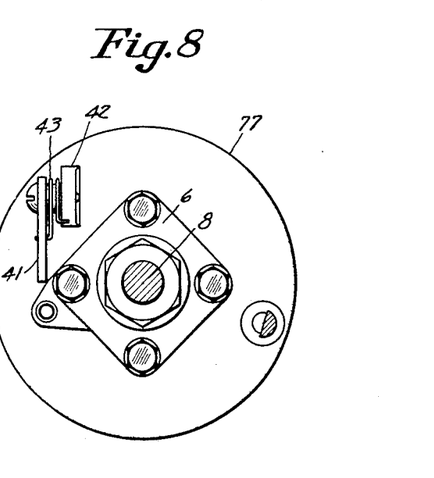
Fig. 8 is a section along the line 8—8 in Fig. 6.

Before the pressure fluid enters chamber 26 it has to first pass through a strainer 53 and then through a nozzle 54 the opening of which decides the speed of parts 7 and 23. To piston 23 a needle 55 is pivotally connected with its one end, the other end of which is arranged to slide within the opening of nozzle 54. Needle 55 moves with parts 7 and 23 and has for its object to keep the opening of nozzle 54 clean from salt-stratifications and impurities possibly present in the fluid. Of course, the diameter of needle 55 must be less than the diameter of the opening in nozzle 54, in order to make the flow of fluid to chamber 26 possible. Chamber 26 is placed in communication by means of channels 56 and 57 (Figs. 5 and 7) with a valve chamber 58 (Figs. 6 and 7). In this chamber pilot valve 33 is arranged and opens and closes the communication between channel 35 and chamber 58 under influence of cam plate 36 arranged on an axis 59, the outer end of which is connected with lever 37. When pilot valve 33 is raised against the action of a spring 60 on rotation of cam plate 36, chamber 26 is brought into communication with chamber 58 by means of channel 35, which latter opens in drain-pipe 16. The pressure in chamber 26 will be decreased then due to the fact that the discharge opening of chamber 58 is greater than the opening in nozzle 54. The liquid pressure in chamber 21 will then predominate the pressure in chamber 26 and thus parts 7 and 23 be moved to the right. (Fig. 4.) When the parts have arrived in their position farthest to the right, lever 37 is reversed by means of a special maneuver mechanism which will be described later on, whereby cam plate 36 is rotated, and valve 33 is seated against its seat 61 by the action of spring 60, thereby interrupting the communication between chamber 58 and channel 35. When lever 37 again is reversed parts 7 and 23 will again move to the left.

In order, under all circumstances, to secure the rotation of member 7, described in connection with Fig. 1, a spring-loaded stopping arrangement 62 has been provided, including a ratchet-device 63 which prevents the rotation of disc 38 in a wrong direction.

Figure 5:
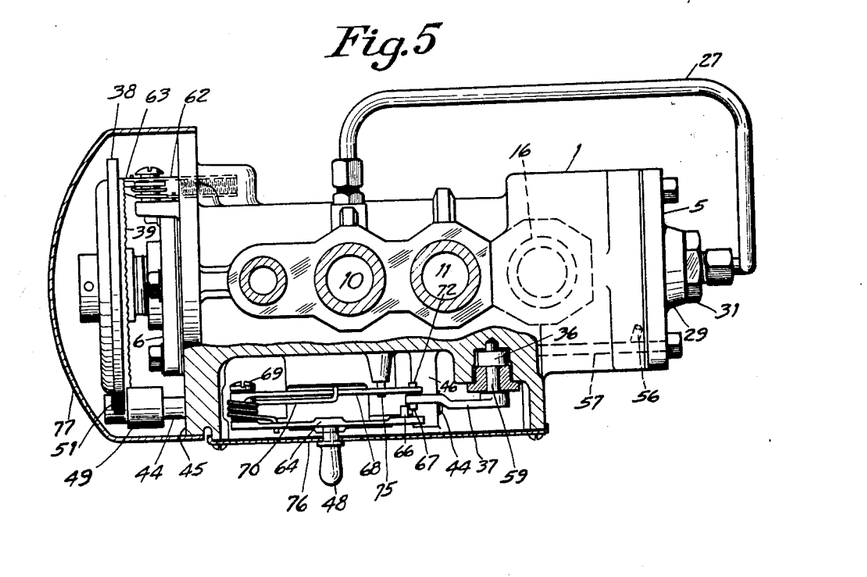
Fig. 5 is a top-view, partly in section, of the valve as shown in Fig. 4.

The valve mechanism is started by moving the handle 48 to the left into a position, shown by Fig. 5. The T-shaped member 64, to which handle 48 is rigidly connected, will then be moved in the same direction together with operating rod 44, which in turn is connected with member 64 by means of a screw 65. The right end of member 64 is provided with a rectangularly shaped projection 66 having an upper and a lower plane sliding surface against which the to- and fro-motion of member 64 and a pin 67 arranged on the outside of the end of lever 37 are adapted to slide. During the movement of member 64 to the left, pin 67 slides on the upper surface of projection 66 whereby lever 37 is kept in the closing position of valve 33. When projection 66 has been sufficiently moved to the left, pin 67 is released from engagement with the upper sliding surface of projection 66. A lever 68, rotatably supported on pin 69 of member 64, and loaded by a spring 70, will, by means of its right angle-shaped part 71, abut against a pin 72 arranged on the inside of lever 37, and thus depress the left end of lever 37 against the action of a spring 73 so that valve 33 is opened. The pressure in chamber 21 will now move parts 7 and 23 to the right, whereby member 7, as above described, is rotated. Disc 38 now comes into engagement with rod 44 which, together with member 64, is moved to the right. During this movement pin 67 slides along the lower surface of projection 66. At the same time an inclined sliding surface 74 of lever 68 will come into engagement with a pin 75 rigidly connected with valve body 1, whereby the right end of lever 68 will be turned upwards. When projection 66 has reached its position farthest to the right, pin 67 is released and lever 37 rotated due to influence of spring 73, so that valve 33 is again closed. Now parts 7 and 23 are again moved to the left and the course described is repeated.

The maneuver mechanism above described is protected by means of a plate 76, and disc 38, with its cooperating parts, by a cap 77. In Fig. 6 plate 76 is removed.

Figures 9, 11, 12:
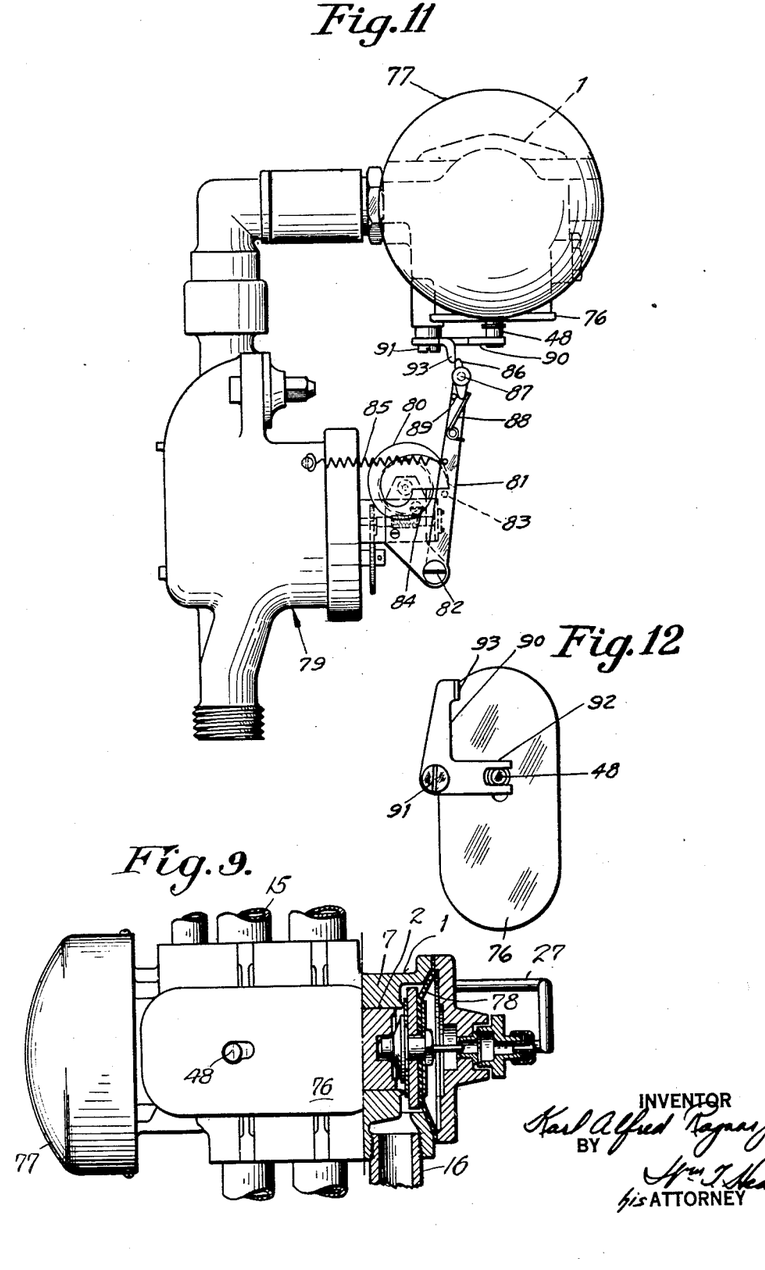
Fig. 9 is an elevational view, partly in section, of a still further embodiment of the valve according to the invention.
Figs. 10 to 12 are different views of the valve according to the invention connected with automatic releasing arrangements.

In the embodiment shown in Fig. 9 piston 23 has been substituted by a membrane 78 in order to prevent possible tearing of special packing members. Otherwise the valve according to this construction is designed and operates in exactly the same manner as the one described in connection with Figs. 4 to 8.

Figure 10:
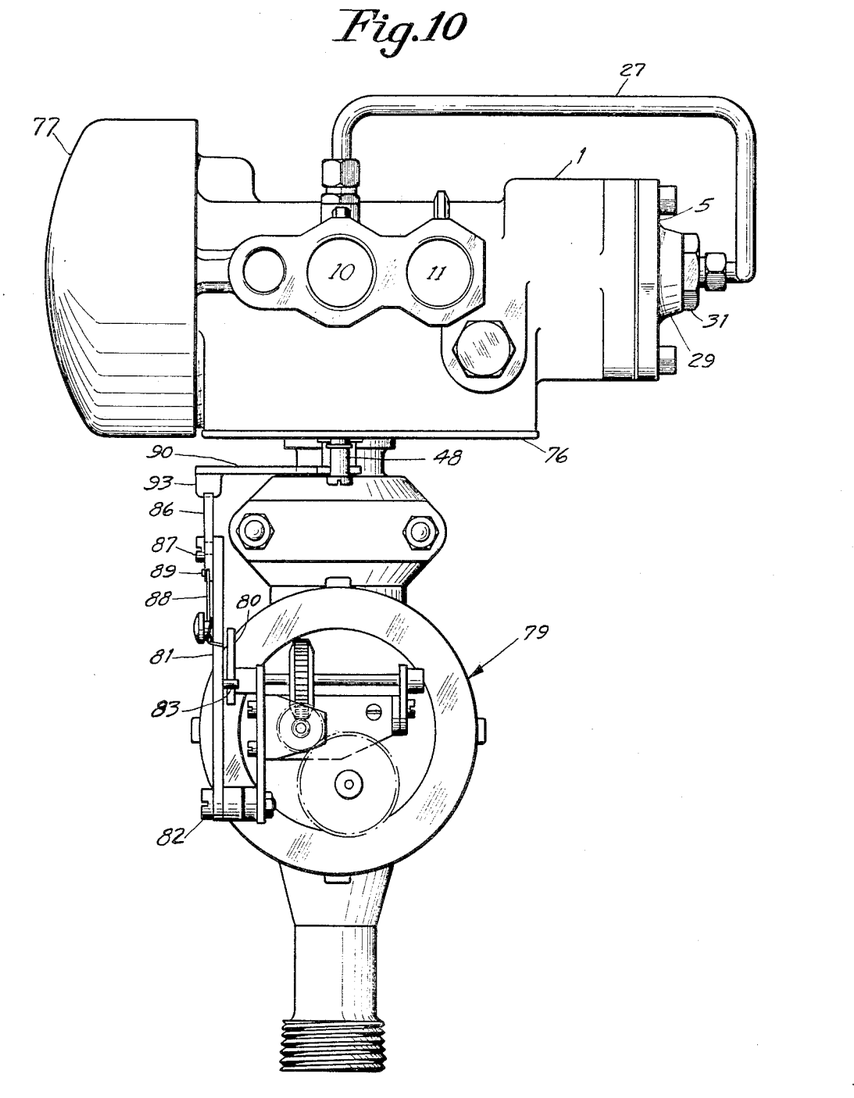

According to Figs. 10 to 12 the valve arrangement has been combined with a common water-meter generally denoted with reference character 79. Meter 79 is provided with a cam plate 80 rotated by the meter mechanism. A lever 81 is rotatably connected to meter 79 by means of a bolt 82 and is provided with a pin 83, which is adapted to slide along the edge of plate 80. Cam plate 80 has a radially directed sliding surface 84. A spring 85 is arranged between the meter and lever 81.

The outer end of lever 81 is provided with a double-armed lever 86, which is pivoted at 87 and has its inner arm pressed by a spring 88 against a stop 89. Lever 86 is thus held from rotation in clockwise direction, and is rotatable in counter-clockwise direction only against the force of spring 88. (Fig. 11.) The lever 86 engages with an angle lever 90 (Fig. 12), which has a fork-shaped part 92 adapted to slidably engage handle 48. The outer end of lever 90 is provided with a hook-member 93 and is pivoted at 91.

When a predetermined amount of water has passed through the valve and hence through the meter 79, and cam plate 80 has rotated into the position shown by Fig. 11, the profile of the cam plate will allow the spring 85 to pull down the lever 81. This causes the angle lever 90 to pivot thus moving handle 48 to the left. During further actuation of water-meter 79 cam plate 80 will rotate and thus raise lever 81 against the action of spring 85. Prior to reaching the position shown in Fig. 11 the pivoted lever 81 will move from the under-side, pass the hook 93 on lever 90 and engage against the upper side of hook 93. This movement is allowed by the provision of pivoted lever 86 which rotates in a counter-clockwise direction on its outward movement as it passes hook 93.

From the foregoing description it will be obvious that the described valve mechanism may be employed in many different applications having different numbers and arrangements of valve ports, and different specific arrangements of the component parts. Thus, for example, the disc 38 may be provided with a plurality of recesses 40 so that the cycle of operation through which the valve moves automatically is less than a full revolution, and likewise the disc 38 may be geared to the valve member so that these two elements rotate at different speeds.

What I claim is:

1. A multiple valve comprising a casing having a plurality of ports including a drain port, a valve member rotatably mounted in said casing and turnable to alter the path of flow of a pressure fluid through said ports and a second member reciprocably mounted in said casing and adapted to engage a seat in the casing under the influence of pressure from the fluid supplied to the valve to close said drain port.

2. A multiple valve comprising a casing having a plurality of ports including a drain port, a valve member rotatably mounted in said casing and turnable to alter the path of flow of the pressure fluid through said ports and a second member reciprocably mounted in said casing at one end of said valve member, said second member being movable under the influence of pressure from the fluid supplied to the valve and adapted to engage a seat in said casing to close said drain port.

3. A multiple valve comprising a casing having a bore with two portions of different diameter and providing a valve seat between said portions, a plurality of ports including a drain port in communication with said bore, said drain port opening into one of said portions and the remaining ports the other of said portions, a main valve member mounted in said other of said portions and turnable to alter the path of flow of a pressure fluid through said ports and a second member axially movable in said one of said portions and operable under the influence of pressure from the fluid supplied to the valve to engage said seat, whereby to close said drain port.

4. A multiple valve comprising a casing having a bore comprising a first portion and a second portion, said first portion being of smaller diameter than said second portion and said casing providing a valve seat between said portions, a plurality of ports including a drain port in communication with said bore, said drain port opening into said second portion and the remaining ports opening into said first portion, a valve member mounted in said first portion and turnable to alter the path of flow of a pressure fluid through said ports and a second valve member axially movable in said second portion and adapted to engage said seat under the influence of pressure from the fluid supplied to the valve, whereby to close said drain port.

5. A multiple valve comprising a casing having a plurality of ports including a drain port and a plurality of valve members, one of said valve members being reciprocably mounted in said casing and turnable due to its reciprocation to direct a pressure fluid admitted through one of said ports alternatively through a plurality of the remaining ports and a second valve member reciprocably mounted in said casing adapted to be moved to a position closing said drain port and to be retained in said position by pressure of the fluid admitted to the valve.

6. A multiple valve comprising a casing having a plurality of ports including an inlet port in constant communication with a source of fluid under pressure and a drain port, a member in said casing operable to direct the fluid admitted through said inlet port alternatively through a plurality of the remaining ports, and a second member adapted to be moved to a position closing said drain port and to be retained in said position by pressure of fluid from said source.

7. A multiple valve comprising a casing having a plurality of ports including an inlet port in constant communication with a source of fluid under pressure and a drain port, a rotatable valve member and a piston in said casing, said valve member being turnable to direct the fluid admitted through said inlet port alternatively through a plurality of remaining ports, said piston being separate from said rotatable valve member and adapted to be moved to a position closing said drain port and to be retained in said position by pressure of fluid from said source.

8. A multiple valve comprising a casing having a plurality of ports, a valve member reciprocably mounted in said casing and rotatable in one direction to alter the flow of a pressure fluid through said ports, said valve member being adapted to be reciprocated due to pressure of the fluid supplied to the valve, and means for causing said valve member to rotate due to its reciprocation.

9. A multiple valve comprising a casing having a plurality of ports, a valve member reciprocably mounted in said casing and turnable to alter the flow of a pressure fluid through said ports, said valve member being adapted to be reciprocated due to pressure of the fluid supplied to the valve, and means for causing said valve to turn in step-by-step progression due to its reciprocation.

10. A multiple valve comprising a casing having a plurality of ports, a valve member reciprocably mounted in said casing and rotatable in one direction to alter the flow of a pressure fluid through said ports, said valve being arranged to be reciprocated by differential fluid pressure applied to the opposite ends of the valve and means for causing said valve to rotate due to its reciprocation.

11. A multiple valve comprising a casing having a plurality of ports, a valve member reciprocably mounted in said casing and turnable to alter the flow of a pressure fluid through said ports, means including pressure chambers at opposite ends of the valve for causing pressure of the fluid admitted to the valve to act axially on said valve member, a pilot valve for causing alteration of the pressure in one of said chambers to cause reciprocation of said valve member, and means for causing said valve member to turn due to its reciprocation.

12. A multiple valve comprising a casing having a plurality of ports, a valve member reciprocably mounted in said casing and turnable to alter the flow of a pressure fluid through said ports, means including pressure chambers at opposite ends of the valve for causing pressure of the fluid admitted to the valve to act axially on said valve member, means for conducting pressure fluid to said chambers from the supply to the valve, a pilot valve for causing alteration of the pressure in one of said chambers to cause reciprocation of said valve member, and means for causing said valve member to turn due to its reciprocation.

13. A multiple valve comprising a casing having a plurality of ports, a main valve member for altering flow of a pressure fluid through said ports upon turning movement of the main valve member, means for causing reciprocation of said main valve member under the influence of pressure from the fluid admitted to the valve, a pilot valve for altering the fluid pressure acting on the main valve member to cause reciprocation thereof, and means for causing said main valve member to turn due to its reciprocation.

14. A multiple valve comprising a casing having a plurality of ports, a main valve member for altering flow of a pressure fluid through said ports upon turning movement of the main valve member, means for causing reciprocation of said main valve member under the influence of pressure from the fluid admitted to the valve, a pilot valve for altering the fluid pressure acting on the main valve member to cause reciprocation thereof, means acting in response to reciprocation of the main valve member for actuating the pilot valve, and means for causing said main valve member to turn due to its reciprocation.

15. A multiple valve comprising a casing having a plurality of ports, a main valve member for altering flow of a pressure fluid through said ports upon turning movement of the main valve member, means for holding said main valve member in a given position of rotation, means for moving said first named means to permit turning movement of the main valve member, means actuated by movement of said last mentioned means for automatically causing reciprocating movement of said main valve member under the influence of pressure from the fluid admitted to the valve, and means for causing turning movement of the main valve member due to its reciprocation, said first mentioned means acting automatically after a predetermined turning movement of the main valve member to hold the same.

16. In a multiple valve, a main valve member turnable to control flow of pressure fluid through the valve, and mechanism for automatically causing reciprocating movement of said member due to the influence of the pressure fluid admitted to the valve and step-by-step turning movement of said member due to said reciprocating movement.

17. In a multiple valve, a main valve member turnable to control flow of pressure fluid through the valve, and mechanism for automatically causing reciprocatory movement of said member due to the influence of the pressure fluid admitted to the valve and step-by-step turning movement of said member due to said reciprocatory movement, said mechanism including parts for automatically stopping movement of the valve after a predetermined turning movement thereof.

18. In a multiple valve, a main valve member turnable to control flow of pressure fluid through the valve, means including a pilot valve operable to cause pressure from the fluid admitted to the valve to reciprocate said member, means for causing said member to turn due to its reciprocation, means for initially operating said pilot valve to cause initial axial movement of said member due to the influence of the pressure fluid admitted to the valve, and means for thereafter operating the pilot valve due to axial movement of said member.

19. In a multiple valve, a main valve member turnable to control flow of pressure fluid through the valve, means for causing said member to move automatically through a predetermined cycle of operation due to the influence of the pressure fluid admitted to the valve, means for holding said valve in a given position, and common operating means for concurrently releasing the holding means and initiating actuation of said first named means.

20. A multiple valve comprising a casing having ends and a plurality of ports, a cylindrical bore extending through said casing between said ends, a valve member reciprocally mounted in said bore and rotatable to alter the flow of a pressure fluid through said ports, a fluid pressure chamber between each of said ends and said valve member, means for admitting fluid under pressure to each of said chambers, means in one of said chambers for intermittently releasing the fluid under pressure to cause reciprocation of said valve member, means for causing said valve member to rotate due to its reciprocation, and means acting in response to reciprocation of the valve member for actuating said means for releasing fluid under pressure.

21. A multiple valve comprising a casing having ends and a plurality of ports intermediate said ends and including a drain port, a cylindrical bore extending through the casing between said ends, said bore having an enlarged portion providing a valve seat, a valve member reciprocably mounted in said bore and rotatable in one direction to alter the flow of a pressure fluid through said ports, a piston adapted to reciprocate in said enlarged portion, means associated with said piston for axially moving said valve member and cooperating with said valve seat to close said drain port, a passage through said valve member for admitting fluid under pressure to a chamber provided between said valve member and one of said ends, said valve member being provided with an extension projecting through said one end, a port through the other of said ends and having an opening greater in diameter than the passage through said valve member, means for admitting fluid under pressure to a chamber between said piston and said last mentioned end, a valve for intermittently closing said last mentioned port to provide a differential pressure between said chambers for reciprocating said valve member, a cam adapted to open said valve upon rotation to release the fluid under pressure from said last mentioned chamber, said extension being operatively connected to a disc having an annular row of teeth on one side, a pawl operatively attached to said casing and adapted to engage said teeth for rotating said disc step-by-step upon reciprocation of said valve member, and an operating rod adapted to be reciprocated by engagement with said disc, a lever for rotating said cam, and means for connecting said operating rod to said lever.

22. A multiple valve comprising a casing having ends and a plurality of ports intermediate said ends and including a drain port, a cylindrical bore extending through the casing between said ends, said bore having an enlarged portion providing a valve seat, a valve member reciprocably mounted in said bore and rotatable in one direction to alter the flow of a pressure fluid through said ports, a piston adapted to reciprocate in said enlarged portion, means associated with said piston for moving said valve member axially and cooperating with said valve seat to close said drain port, a passage through said valve member for admitting fluid under pressure to a chamber provided between said valve member and one of said ends, means for admitting fluid under pressure to a chamber provided between said piston and the other of said ends, a remotely positioned pilot valve for intermittently releasing pressure from said last mentioned chamber to provide a differential pressure in said chambers for reciprocating said valve member, said valve member being provided with an extension projecting through said one end, a disc operatively connected to said extension and having an annular row of teeth on one side, a pawl operatively mounted on said casing and adapted to engage said teeth for rotating said disc step-by-step through a predetermined cycle of operation upon reciprocation of said valve member, means associated with said disc for actuating said intermittently operating pilot valve and for holding the pilot valve in a closed position after said predetermined cycle of operation has been completed, and means for releasing said pilot valve from the closed position to initiate its actuation.

23. A multiple valve comprising a casing having ends and a plurality of ports intermediate said ends, a cylindrical bore having two different diameters and extending through the casing between said ends, a main valve member reciprocably mounted in the smaller diametered portion of said bore and rotatable to alter the flow of a pressure fluid through said ports, and a diaphragm member arranged in and extending across the larger diametered portion, means associated with said diaphragm member for engaging said main valve member to move it in one direction, a passage through said main valve member for admitting fluid under pressure to a chamber provided between said main valve member and one of said ends, said main valve member being provided with an extension projecting through said one end, means for admitting fluid under pressure to a chamber between said diaphragm member and the other of said ends, valve means adapted to intermittently discharge the fluid under pressure from the last mentioned chamber at a greater rate than that at which it is admitted to provide a differential pressure between said chambers for reciprocating said main valve member, a disc operatively connected with said extension and having an annular row of teeth on one side, a pawl attached to said casing and aadpted to engage said teeth upon reciprocation of said main valve member to cause rotation of said disc and the main valve member step-by-step through a predetermined cycle of operation, means associated with said disc for operating said valve means and for holding said valve means in a closed position after said predetermined cycle of operation, and means for releasing said valve means from its closed position to initiate actuation of said valve member.

24. A multiple valve comprising a casing having a plurality of ports including a drain port, a valve member reciprocably mounted in said casing and turnable due to its reciprocation to alter the path of flow of a pressure fluid through said ports and a second member reciprocably mounted in said casing and operable under the influence of pressure from the fluid supplied to the valve to cause axial movement of said valve member, said second member comprising a portion adapted to be seated against a cooperating portion of said casing under the influence of said pressure to close said drain port.

25. In a multiple valve comprising a plurality of ports including a drain port and a main valve member for controlling flow of fluid through said ports, means actuated by pressure from the fluid supplied to the valve for moving said main valve member comprising a member movable under the influence of said pressure to cause movement of said main valve and to seat against said casing in certain positions of the main valve to close said drain port.

26. A multiple valve for distributing fluid comprising a casing having a plurality of ports, a valve member turnably mounted in said casing and having a plurality of angularly displaced controlling positions for governing flow of fluid through different of said ports and automatic means for turning said valve member in a plurality of steps from one controlling position to the next succeeding controlling position.

27. A multiple valve for distributing fluid comprising a casing having a plurality of ports, a valve member turnably mounted in said casing and having a plurality of angularly displaced controlling positions for governing flow of fluid through different of said ports and automatic means actuated by pressure from the fluid supplied to the valve for turning said valve member in a plurality of steps from one controlling position to the next succeeding controlling position.

28. A multiple valve for distributing fluid comprising a casing having a plurality of ports, a valve member turnably and reciprocably mounted in said casing and having a plurality of angularly displaced controlling positions for governing flow of fluid through different of said ports, fluid pressure actuated means for causing reciprocation of said valve member and means associated with said valve member for causing each reciprocation of said valve member to turn the same through an angle less than that required to move the valve member from one of said controlling positions to the next succeeding controlling position.

29. A multiple valve for distributing fluid comprising a casing having a plurality of ports, a valve member turnably and reciprocably mounted in said casing and having a plurality of angularly displaced controlling positions for governing flow of fluid through different of said ports, said valve member having a portion projecting through said casing and means outside of said casing cooperating with said projecting portion to cause the valve member to turn upon each reciprocation thereof through an angle less than that required to turn the valve member from one controlling position to the next succeeding controlling position, whereby to effect movement of said valve member from one controlling position to the next succeeding controlling position in a plurality of steps.

30. A multiple valve for distributing fluid comprising a casing having a plurality of ports, a valve member turnably and reciprocably mounted in said casing and having a plurality of angularly displaced controlling positions for governing flow of fluid through different of said ports, said valve member having a portion projecting through said casing and ratchet means between said projecting portion and a fixed abutment for causing the valve member to turn from one controlling position to the next succeeding controlling position in a plurality of steps, each successive step being effected due to a successive reciprocation of the valve member.

31. In a valve mechanism, a rotary valve capable of moving endwise a limited distance, a ratchet wheel fixed to said valve, a pawl, and means first to shift the valve endwise slightly and then bring the pawl into driving relation to the ratchet wheel and causing the valve to turn.

KARL ALFRED RAGNAR JOHANSSON.